March 6, 1951  B. LERMONT  2,543,785
PANEL CONTROL
Filed Dec. 21, 1946  2 Sheets-Sheet 1
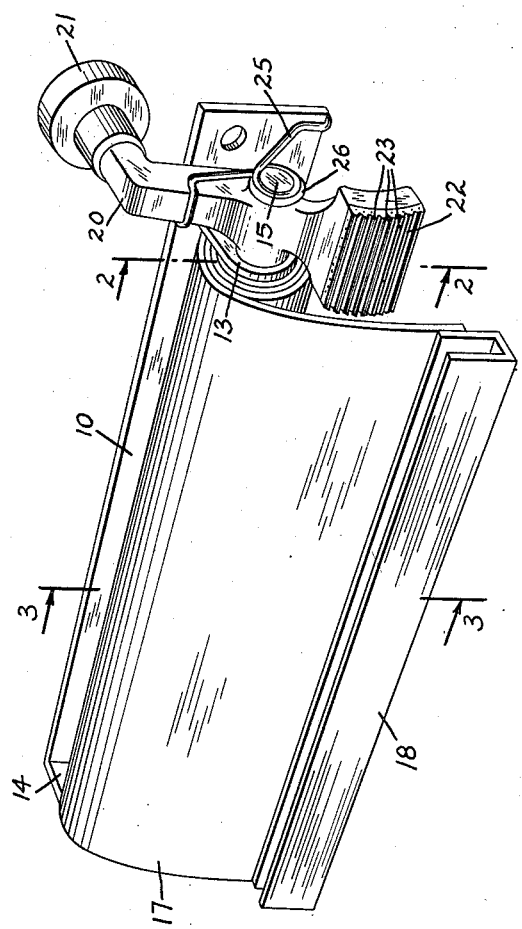
INVENTOR.
BASIL LERMONT
BY
HIS ATTORNEYS.

March 6, 1951  B. LERMONT  2,543,785
PANEL CONTROL
Filed Dec. 21, 1946  2 Sheets-Sheet 2
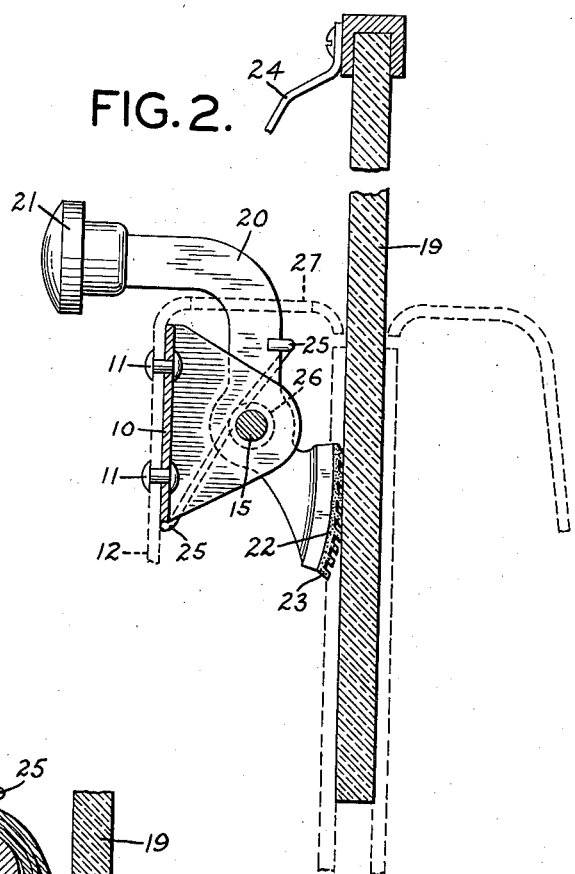
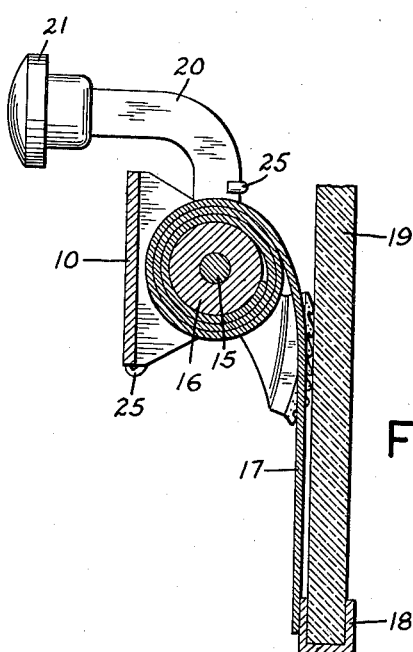
INVENTOR.
BASIL LERMONT
BY Campbell Brumbaugh & Free
HIS ATTORNEYS Patented Mar. 6, 1951

2,543,785

UNITED STATES PATENT OFFICE 2,543,785

PANEL CONTROL

Basil Lermont, New York, N. Y., assignor to Sutton Patents, Inc., New York, N. Y., a corporation of New York Application December 21, 1946, Serial No. 717,707

5 Claims. (Cl. 16—197)

This invention relates to devices for moving slidable panels such as, for example, window sashes, automobile windows, sliding door panels and the like. It relates particularly to devices for automatically moving such panels to an open or a closed position while permitting easy movement of the panel in the opposite direction by manual or power actuated mechanisms.

An object of the present invention is to provide a simple, compact mechanism which is easily applied to a slidable panel for moving the panel in one direction by spring action.

Another object of the invention is to provide a compact, simple, panel control mechanism which is free from gears or other motion transmitting elements that can jam, wear, loosen or rattle.

Other objects of the invention will become apparent from the following description of a typical form of device embodying the present invention.

In accordance with the present invention, I have provided a panel control mechanism which includes a coiled resilient strip of metal having one end thereof supported on a rotary member so that the strip of metal can be uncoiled and extended into a tensioned condition. The strip of metal is provided with means on its outer free end for securing it to the edge of the slidable panel, for example, the window panel of an automobile so that, when the window is opened, the strip is uncoiled and placed under a tension sufficient to return the window to closed position.

Panel controls embodying the present invention may also be provided with a locking device, preferably acting as a friction brake, to retain the panel in a desired position, this brake being releasable at will in order to permit the panel to be moved to a position corresponding to the coiled condition of the metal strip.

The spring strip may be longitudinally and transversely curved and of a suitable width, depending upon the strength required for moving the panel element and it preferably is supported on its inner end on a freely rotatable shaft or roller so that the strip may be uncoiled and extended and may resume its coiled form without resistance.

Also, in the preferred form of the device, the shaft which supports the coiled strip of metal, may also support a manually operable lever which is provided at one end with a surface of friction material adapted to engage the panel and retain it in its adjusted position.

In window constructions for automobiles, for example, the device may be housed within the door or body structure adjacent the window with only the brake control lever exposed for manipulation to allow movement of the window to closed position.

The window panel may be provided with a handle, preferably at its top, so that the window may be opened manually and will be retained in open or partially open position by the action of the friction brake member.

The above-described mechanism has the advantage of being considerably less complicated than conventional gear-operated window actuating mechanisms; it contains few parts that can become loose and rattle, as in the conventional construction, and it greatly facilitates the operation of the windows.

For a better understanding of the present invention, reference may be had to the accompanying drawings, in which:

Figure 1 is a perspective view of a typical form of panel control device embodying the present invention;

Figure 2 is a view in end elevation of the device with a window panel and a portion of an automobile body shown in dotted lines therein; and Figure 3 is a view in section taken on line 3—3 of Figure 1 with a window closed and the panel shown inserted in the lower end of the strip.

The form of the invention chosen for purposes of illustration will be described hereinafter as applied to the window of an automobile or other vehicle, but it will be understood that the device is applicable to many other purposes and constructions wherein slidable panels are required, such as, for example, in sliding doors, closures, hatches, and the like.

The device as shown in the drawings may include a plate member 10 which, as illustrated in Figure 2, forms the base of the device and may be secured by means of rivets 11 or other similar fastening means to the interior panel 12 of an automobile body or door. The plate or base member 10 is provided with right angularly related ears or flanges 13 and 14 in which is mounted a shaft or spindle 15. The shaft or spindle 15 extends generally parallel to the base member 10 and supports a roller 16 for rotation relatively thereto.

Mounted on the roller is a resilient strip of metal 17 of normally coiled form which, when extended, is subjected to tension stresses which normally tend to cause the strip to coil. The strip of metal 17 may be an ordinary coiled spring formed of tempered steel or the like but preferably it is a strip of metal which has been subjected to drawing and shaping stresses in order to upset the strip into longitudinally and transversely curved form and to stress the opposite sides of the strip unequally whereby the strip tends to coil. The tension required to uncoil the spring varies, of course, with the width and/or thickness of the spring, and the characteristics of the spring may be modified by tapering the spring in width and/or thickness.

The inner end of the metal strip 17 is secured to the roller 16 by means of rivets, screws or other similar fastening elements, and the outer end of the strip may be provided with a channel member 18 which is adapted to receive the lower edge of a window panel 19, as illustrated in Figure 3. The channel member 18 may be of spring steel or other metal so that it grips the edge of the window panel 19 resiliently, thereby retaining the panel firmly therein.

The width of the strip 17 may be varied substantially, depending upon the required strength of the strip. Thus, for light and easily moved panels or closures, the strip may be relatively narrow, for example, two to three inches in width or even less. For heavy panels requiring a strong lifting action, the width of the strip may be substantially greater, for example, eight to ten inches in width. The width of the strip is immaterial so far as the appearance of the device is concerned since, as illustrated, the entire unit may be housed within the auto body or other structure and thus is not visible.

The arrangement described above would normally tend to move the window to a closed position and means must be provided for resisting the action of the spring strip 17 so that when the window 19 is opened it will remain open until it is released for movement toward closed position.

The mechanism for retaining the window panel in open or partially open condition may consist of a generally L-shaped lever 20 having a release button or knob 21 on one end and a braking surface 22 formed of friction material such as rubber or the like on its opposite end. As best shown in Figure 2, the friction material 22 will take the form of a transversely ribbed strip of rubber having the ribs 23 inclined inwardly and downwardly so as to afford strong frictional resistance to upward movement of the window panel 19 while providing less resistance to movement of the panel 19 downwardly when it is so displaced by means of the handle 24 at the upper edge of the panel. The lever 20 is pivotally supported on the shaft 15 for rocking movement thereabout and is normally biased into engagement with the window panel 19 by means of spring member 25 having one end engaging the base plate 10 and the other end engaging the lever 21 with loop portion 26 encircling the shaft 15 to retain the spring in position. The location of the pivot point of the lever is such that the lever tends to wedge against the panel 19 by the components of force acting thereon when the panel is urged upwardly, thereby tending to resist movement of the panel even more strongly.

As shown in Figure 2, the lever arm 20 may extend upwardly through an opening 27 in the upper edge of the body panel so that the release button is accessible for operation.

When the control mechanism is assembled with the panel as illustrated in Figure 2, the window panel 19 may be opened by grasping the handle 24 and pulling or drawing the window downwardly into the body of the car. The panel slides past the friction surface 22 of the lever on the lever 21 but the lever, because of the shape of the friction surface 22 and the components of force acting thereon, will tend to lock the panel against upward movement. The downward movement of the panel, of course, uncoils the metal strip 17 from the roller 16 and places it under tension such that it normally urges the panel 19 upwardly. If the window is to be closed or partially closed, the release button 21 is pressed, thereby moving the friction surface 22 out of contact with the panel 19 and allowing the spring strip 17 to raise the panel 19. Upward movement of the panel 19 can be stopped by releasing the release button 21. Likewise, the window may be partially opened and retained in such partially-opened condition by merely pulling the panel down to the desired position.

From the preceding description it will be apparent that I have provided a simplified window or panel control mechanism which is devoid of gearing, racks or other mechanisms which characterize the conventional window control unit. The mechanism is compact, free from parts that would tend to rattle or become damaged through misuse, and it can be housed completely within the supporting structure with only the control knob or released knob exposed to view.

The device is susceptible to considerable modification in the size of the elements which are largely determined by the weight of the panel being moved. Such other modifications as attachment of the metallic strip directly to the supporting shaft 15 and change in the shape of the base member may be made without departing from the invention. Therefore, the form of the invention described herein should be considered as illustrative and not as limiting the scope of the following claims.

I claim:

1. A device for actuating a closure member slidably movable in guides in a supporting structure, to cover and uncover an aperture in said structure, comprising a bracket member mounted adjacent the edge of said aperture in the direction of movement of said closure member to uncover said aperture, a roller rotatably mounted on said bracket member, a resilient strip of metal coiled about said roller, means at the outer end of said strip for engagement with the edge of said closure member adjacent to said bracket when said member covers said aperture, said strip being uncoiled as said closure member is moved to uncover said aperture and being sufficiently stressed to move said closure member to cover said aperture when uncoiled, and a brake member movably mounted adjacent to said roller for releasable engagement with said closure member.

2. A device for actuating a slidable closure member, comprising a bracket, a roller mounted rotatably in said bracket, a normally coiled resilient strip of metal connected at one end to said roller, said strip being extensible by tension exerted thereon and normally tending to coil up on said roller, means at the opposite end of said strip for connecting it to said closure member, a lever pivotally mounted on said bracket, friction means on one end of said lever, and means biasing said lever to engage said friction means with said closure member to retain the latter in a desired position.

3. A window closing device for windows having a window panel and guides slidably receiving said panel, comprising a bracket, a shaft mounted in said bracket, a roller mounted on said shaft for rotation, a normally coiled, resilient strip of metal having one end connected to said roller and adapted to coil around said roller, means for securing the opposite end of said strip to an edge portion of said panel for resiliently urging said panel toward closed position, a lever pivotally mounted in said shaft, friction material on one end of said lever, and means urging said lever in a direction to engage said panel with said friction material to resist movement of said panel by said resilient strip.

4. A device for actuating a substantially vertically movable closure member to close an aperture in a supporting structure, comprising a resilient strip of metal that is stressed to cause it to normally form a coil, means connected to the inner end of said coil and supporting said coil rotatably, said supporting means being mounted on said structure adjacent to the lower edge of said aperture, means at the outer end of said strip to engage the lower edge of said closure member so that when the latter is moved downwardly from an initially closed position, said strip is uncoiled and tensioned sufficiently to move said closure member upwardly to said closed position, and means for releasably retaining said closure member in any of its open and partially open positions.

5. A device for moving a closure panel upwardly to close an aperture in a supporting structure, comprising a resilient, normally coiled spring of substantial width, means at the outer end of said spring for connecting it to the lower edge of said panel, a member rotatably mounted adjacent to said lower edge of said aperture and connected to the inner end of said spring, said member being so located that said spring is at least partially uncoiled when said panel is displaced downwardly from closed position and is stressed sufficiently to move said panel upwardly toward said closed position, and brake means mounted on said supporting structure adjacent to said panel for releasably retaining said panel against movement by said spring to closed position.

BASIL LERMONT.

REFERENCES CITED

The following references are of record in the file of this patent:

UNITED STATES PATENTS

| Number | Name | Date |
| --- | --- | --- |
| 1,006,264 | O'Leary | Oct. 17, 1911 |
| 1,646,218 | Roethel | Oct. 18, 1927 |
| 1,670,595 | Plummer | May 22, 1928 |
| 1,745,578 | Kreissig | Feb. 4, 1930 |